United States Patent [19]

Abramov

[11] Patent Number: 4,780,732
[45] Date of Patent: Oct. 25, 1988

[54] DUAL INTERACTION TIR MODULATOR

[75] Inventor: Igor Abramov, Redondo Beach, Calif.

[73] Assignee: Xerox Corporation, Stamford, Conn.

[21] Appl. No.: 171,364

[22] Filed: Mar. 21, 1988

[51] Int. Cl.⁴ .............................................. G01D 15/00
[52] U.S. Cl. .................................... 346/160; 346/154
[58] Field of Search ........... 346/160, 154, 155, 107 R, 346/108; 364/518–523; 350/356, 355, 358, 96.13, 96.14; 400/119; 101/DIG. 13; 358/300, 302, 294, 295

[56] References Cited

U.S. PATENT DOCUMENTS 4,395,721  7/1983  Ohno et al. ...................... 346/160
4,421,387 12/1983  Sprague .......................... 346/107 R
4,425,023  1/1984  Matsumato et al. ............. 346/107 R

*Primary Examiner*—Arthur G. Evans
*Attorney, Agent, or Firm*—Franklyn C. Weiss

[57] ABSTRACT

This invention relates to electro-optic line printers and, more particularly to dual region TIR (total internal reflection) modulators. An electro-optical modulator is disclosed wherein the driving electrodes are implemented in two offset, but connected, sections to effectively double the output resolution of the modulator. Longitudinally displaced, laterally staggered electrode arrays are used to produce the laterally staggered fringe field patterns. Since the impinging light beam will defocus while being deflected, means are provided to focus the beam into first and second interaction regions being addressed.

20 Claims, 4 Drawing Sheets

DUAL INTERACTION TIR MODULATOR

This invention relates to electro-optic line printers and, more particularly, to dual region TIR (total internal reflection) modulators. An electro-optical modulator is disclosed wherein the driving electrodes are implemented in two offset, but connected, sections to effectively double the output resolution of the modulator.

BACKGROUND OF THE INVENTION

The prior art shows that an electro-optic element having a plurality of individually addressable electrodes can be used as a multi-gate light valve for line printing. See, for example, a commonly assigned U.S. patent application of R. A. Sprague et al., now U.S. Pat. No. 4,281,904 on a "TIR Electro-Optic Modulator With Individually Addressed Electrodes." Also see "Light Gates Give Data Recorder Improved Hardcopy Resolution," Electronic Design, July 19, 1979, pp. 31-32; "Polarizing Filters Plot Analog Wavforms," Machine Design, Vol. 51, No. 17, July 26, 1979, p. 62; and "Data Recorder Eliminates Problem of Linearity," Design News, Feb. 4, 1980, pp. 56-57.

As taught in the prior art, almost any optically transparent electro-optical material can be used as the electro-optic element of such a light valve. Some promising materials appear to be $LiNbO_3$ and $LiTaO_3$, but there are other materials which qualify for consideration, including BSN, KDP, $KD^xP$, $Ba_2NaNb_5O_{15}$ and PLZT. In any event, the electrodes of such a light valve are intimately coupled to the electro-optic element and distributed in non-overlapping relationship widthwise of the electro-optic element (i.e. orthogonally relative to its opticl axis), typically on equidistantly separated centers so that there is a generally uniform inter-electrode gap spacing.

To perform line printing with such a multi-gate light valve, a photosensitive recording medium, such as a xerographic photoreceptor, is exposed in an image configuration as it advances in a cross line direction (i.e., a line pitch direction) relative to the light valve. More particularly, to carry out the exposure process, a sheet-like collimated light beam is transmitted through the electro-optic element of the light valve, either along its optical axis for straight through transmission or at a slight angle relative to that axis for total internal reflection. Furthermore, successive sets of digital bits or analog signal samples (hereinafter collectively referred to as "data samples"), which represent respective collections of picture elements or pixels for successive lines of the image, are sequentially applied to the electrodes. As a result, localized electric bulk or fringe fields are created within the electro-optic element in the immediate vicinity of any electrodes to which non-reference level data samples are applied. These fields, in turn, cause localized variations in the refractive index of the electro-optic element within an interaction region (i.e., a light beam illuminated region of the electro-optic element which is subject to being penetrated by the electric fields). Thus, the phase front or polarization of the light beam is modulated (hereinafter generically referred to as "p-modulation" of the light beam) in accordance with the data samples applied to the electrodes as the light beam passes through the interaction region. Schlieren readout optics may be used to convert a phase front modulated light beam into a light beam having a correspondingly modulated intensity profile. For example, the phase front modulated light beam may be imaged onto the recorded medium by central dark field or central bright field imaging optics. Alternatively, if the input light beam is polarized, the polarization modulation to intensity modulation conversion process may be performed by passing the polarization modulated output beam through a polarization analyzer. In more generic terms, the p-modulation of the light beam is converted into a correspondingly modulated intensity profile by using "p-sensitive readout optics" to image or project (hereinafter collectively referred to as imaging) the light beam onto the recording medium.

Unfortunately these prior art devices suffer from electrode aligned blind spots. Such blind spots exist because of the inherent electroe aligned nulls in such fringe fields. One prior art solution was taught by Robert A. Sprague in "Electro-Optic Line Printer", U.S. Pat. No. 4,389,659, issued June 21, 1983, and commonly assigned as the present application. The blind spot problem was avoided in this prior art patent by using a light valve which has a pair of longitudinally displaced, laterally staggered electrode arrays to produce essentially identical, laterally staggered fringe field patterns.

According to the present invention, similar longitudinally displaced, laterally staggered electrode arrays are used to produce the laterally staggered fringe field patterns. Since the impinging light beam will defocus while being deflected, means are provided to focus the beam into first and second interaction regions being addressed. A correcting lens can be provided of which position or its optical power can be dynamically controlled. A voice-coil activated lens can be utilized to control the variable position focussing lens.

DESCRIPTION OF THE DRAWINGS

For a more complete understanding of the invention, reference may be had to the following detailed description of the invention in conjunction with the drawings wherein:

FIG. 1a is an enlarged top view of the prior art electrodes utilized in previous electro-optic TIR modulators, while

FIG. 5a is an enlarged top view of a pair of longitudinally displaced and laterally staggered electrode arrays utilized in the present invention with three interaction zones, while

DETAILED DESCRIPTION OF THE INVENTION

As set forth above, U.S. Pat. No. 4,389,659 discloses a light valve which has a pair of longitudinally displaced, laterally staggered electrode arrays to produce essentially identical, laterally staggered fringe field patterns. As background, however, in FIGS. 1 to 5 of this patent, herein incorporated by reference, is disclosed an electro-optic line printer 11 comprising a multi-gate light valve 12 for exposing a photosensitive recording medium 13 in an image configuration. The recording medium 13 is depicted as being a photoconductively coated xerographic drum 14 which is rotated (by means not shown) in the direction of the arrow. It is stated that other xerographic and non-xerographic recording media that could be used, including photoconductively coated xerographic belts and plates, as well as photosensitive film and coated paper which may be supplied as web or cut sheet stock. The recording medium 13 could, therefore, be visualized in the generalized case as being a photosensitive medium which is exposed in an image configuration while advancing in a cross line or line pitch direction relative to the light valve 12.

Figure 3:
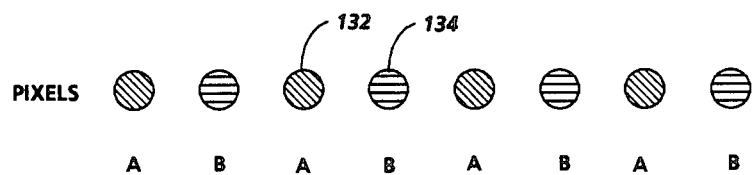
FIG. 3 is a representation of the output plane of pixels showing the alternate deflected lights beams from the two separate zones on the TIR modulator.
Figure 4:
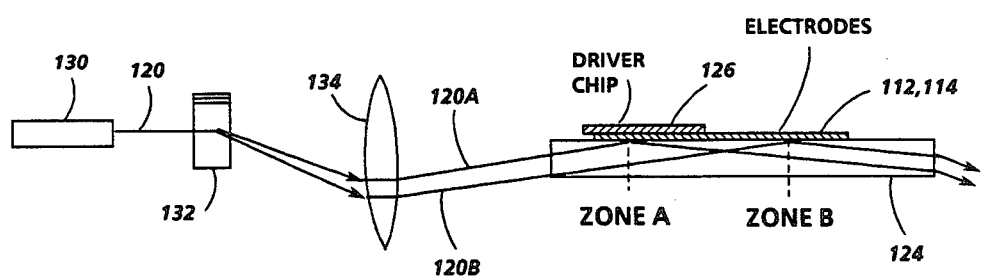
FIG. 4 is a schematic side view of the two zone TIR optical modulator in accordance with the principles of the present invention.

As best shown in FIGS. 3 to 5 of the aforementioned patent, the light valve 12 includes an electro-optic element 17, a plurality of individually addressable electrodes (18a–18i), and a corresponding plurality of ground plane electrodes (19a–19i). For a total internal reflection (TIR) mode of operation as illustrated therein, the electro-optic element 17 typically is a y cut crystal of, say, LiNbO$_3$ (lithium niobate) having a polished reflecting surface 21 which is integral with and disposed between polished input and output face 22 and 23, respectively. The electrodes (18a–18i) and (19a–19i) are intimately coupled to the electro-optic element 17 adjacent the reflecting surface 2 and are distributed across essentially the full width of the electro-optic element 17 in alternating parallel paired relationship. Typically, the electrodes (18a–18i) and (19a–19i) are approximately 1 to 30 microns wide and are on centers which are more or less equidistantly separated to provide a generally uniform inter-electrode gap spacing of 1 to 30 microns. Furthermore, the electrodes (18a–18i) and (19a–19i) are illustrated, as is in FIG. 1A of the present application, as extending generally parallel to the optical axis of the electro-optic element 17 so that they each have a projection of substantial length along that axis.

In referring to FIGS. 1 to 5 of the U.S. Pat. No. (4,389,659) for a review of the operation of the line printer 11, a sheet-like collimated beam of light 24 from a suitable source, such as a laser (not shown), is transmitted through the input face 22 of the electro-optic element 17 at a grazing angle of incidence relative to the reflecting surface 21. The light beam 24 is brought to a wedge shaped focus (by means not shown) at approximately the centerline of the surface 21 and is totally internally reflected therefrom for subsequent transmission through the output face 23. As will be seen, the light beam 24 illuminates substantially the full width of the electro-optic element 17 and is phase front modulated while passing therethrough in accordance with the data samples applied to the electrode pairs (18a, 19a)–(18i, 19i).

Figure 1A:
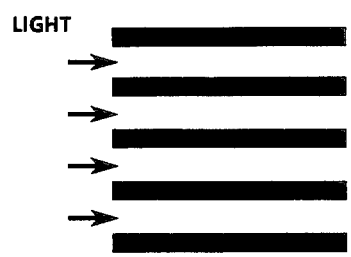
Figure 1B:
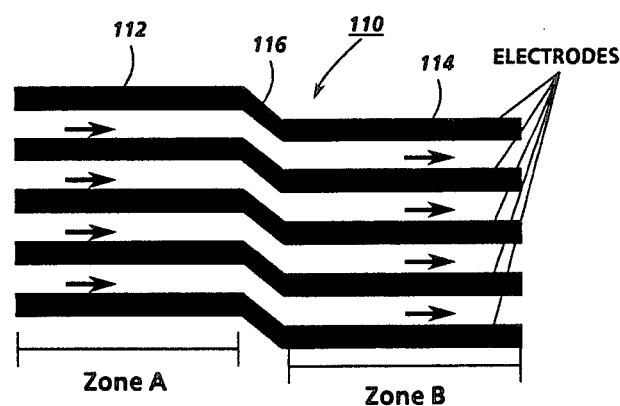
FIG. 1b is an enlarged top view of a pair of longitudinally displaced and laterally staggered electrode arrays utilized in the present invention.
Figure 2:
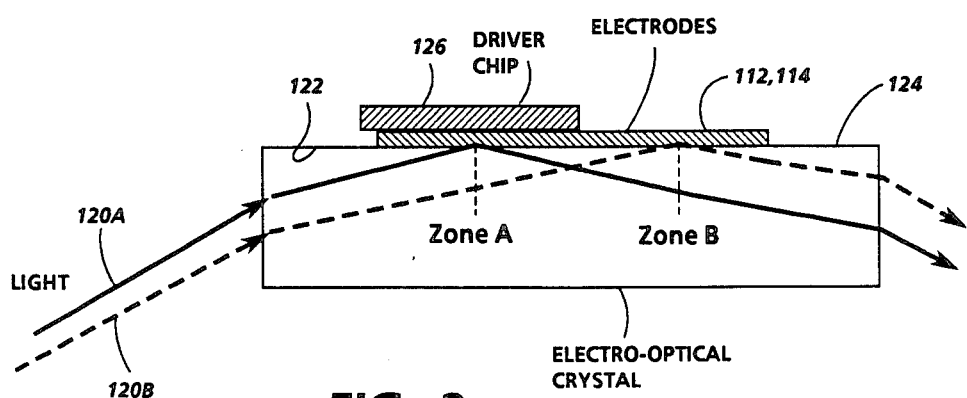
FIG. 2 is a side view of a TIR light valve for the electro-optic line printer of the present invention displaying the two regions of light beam and crystal interaction.

FIG. 1A of the present application is drawn to the prior art discussion in the aforementioned patent, while FIG. 1B of the present application is also seen in the cited patent, but shown here for purposes of the present invention. Unfortunately, the light valves in FIG. 1 of this application have blind spots because the fringe fields terminate on the electrodes and, therefore, have electrode aligned nulls. As shown in FIG. 1B, to avoid such blind spots, a light valve 110 having a pair of substantially identical, longitudinally displaced and laterally staggered electrode arrays 112 and 114 may be employed. The arrays 112 and 114 are adjacent the reflecting surface 122 of the electro-optic element 124 and are displaced from one another along its optical axis on opposite sides of the line upon which the light beams 120A and 120B are focused. See FIG. 2 herein. Moreover, the individual electrodes within the arrays 112, zone A, and 114, zone B, are laterally offset from one another by approximately one half the inter-electrode gap spacing. To ensure that the full phase fronts of the light beams are modulated, the corresponding electrodes of the two arrays 112 and 114 (i.e., the electrodes in corresponding picture element positions) are electrically interconnected or are simultaneously addressed in parallel by the driver chip 126. These staggered electrodes permit a shift of the whole output pixel pattern, depending on which one of the two straight areas 112, 114 of the electrodes are being addressed.

The shift of the output pattern can be used to interlace two half-lines at the output with the two consecutive write operations, thus effectively doubling the output resolution of the modulator. Where the prior art would have disclosed output pixels 132, this invention discloses output pixels 132 and 134 from both zones A and B. See FIG. 3. Each of the interaction regions has a length comparable to the length of the whole electrodes cited in the prior art. The main difference in operation of the present arrangement is that only one region is illuminated at a time, and contributions from the skewed portions of the electrodes are eliminated. In the prior art both of the staggered and skewed sections had to be illuminated for pixel 'smearing'.

Figure 8:
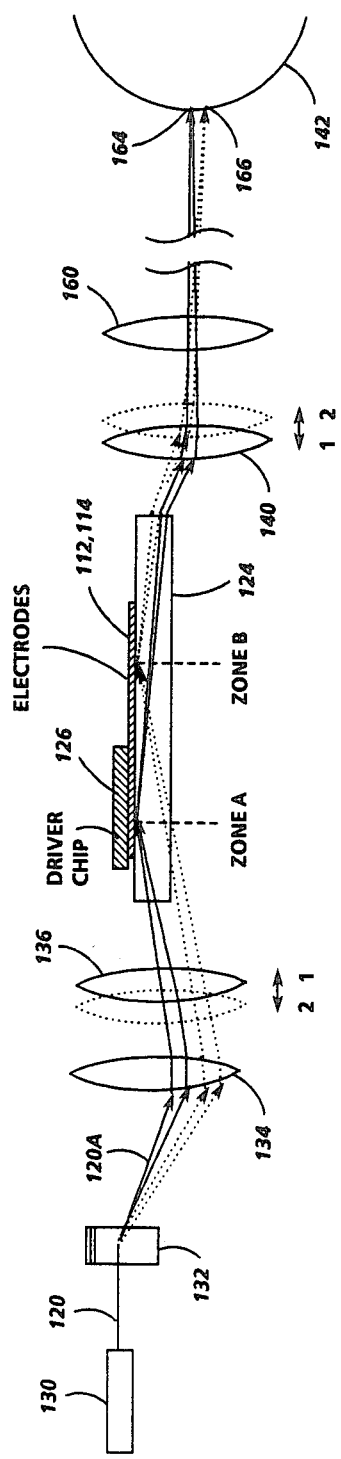
FIG. 8 is a schematic side view of the two zone TIR optical modulator in accordance with the principles of the present invention utilizing dynamic focus correction with dual lenses before and after the electro-optic modulator.

The prior art technique, as disclosed in FIG. 8 of the aforementioned U.S. Pat. No. 4,389,659, showed the earlier disclosure on this subject; the problem being the focus of the applied light source. When the light was focussed on the center, offset section 116 in FIG. 1B, the output light pixels were of reduced intensity and not in focus. This is because the interaction between the electrodes and the electo-optic crystal is most effective at the center of each array. With the light beam focussed at the offset section, the applied light was not in focus or as a bright as it would be at the center of either array. Applicant's invention, however, teaches the use of two beams or one beam selectively deflected, to impinge upon the center section of the array 112 at zone A and the center section of the array 114 at zone B for optimal operation of the modulator. See FIG. 2.

In FIG. 4 of the present application is shown one embodiment of this invention. This figure shows that the addressing of the different areas on the electrode pattern by light can be accomplished by an acousto-optic modulator 132 positioned before the TIR modulator 124, by an electro-optic deflector, or other means.

Thus, laser 130 is seen to generate an output light beam 120. Collimating and other focus lenses may be used, as needed, but are not shown. From the laser 130, light beam 120 impinges on any of the well known prior art types of acousto-optic modulators 132. Upon proper signal input to the a.o. modulator, the input laser light is separated into two beams 120A and 120B. These light beams are then focussed by lens 134 onto the electro-optic crystal 124. In this figure, however, the incident beam, for successful operation of the modulator, has to be focussed in the center of the interaction region, area 116, for example, in FIG. 1B. Since the beam will defocus while being deflected, it is necessary to provide means to focus the beam into an interaction region being addressed.

Figure 6:
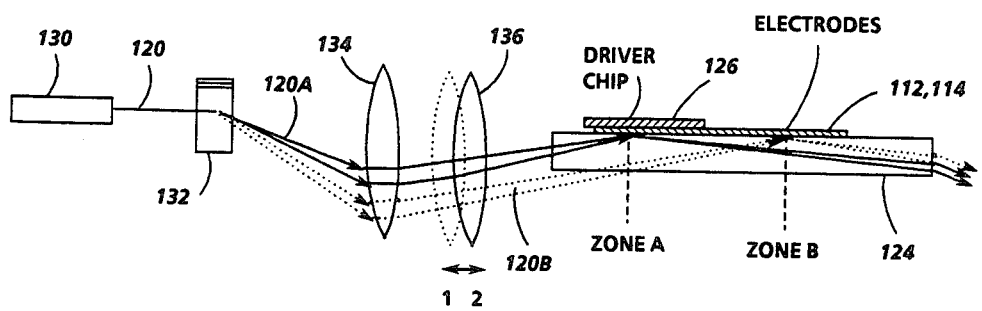
FIG. 6 is a schematic side view of the two zone TIR optical modulator in accordance with the principles of the present invention utilizing dynamic focus correction with dual lenses.

One such technique for solving this aspect is shown in FIG. 6. A feasible focussing device can be a correcting lens 136 which position or optical power is being dynamically controlled. A voice coil activated lens, of which the prior art is aware, similar to the types used in commercial compact disk (CD) players, is one example of a variable-position focussing lens. An optical power type of lens could be one of the electrically controlled zoom lenses, where the optical power can be changed by electronic control. When the beam 120 is shifted from zone A (beam 120A) to zone B (beam 120B) by the compound action of the acousto-optical modulator 132 and the deflecting lens 134, the focussing lens 136 is driven from position 1 to position 2 by the voice coil 141. Since the beam diameter in the sagittal plane is small, the lens 136 can be made quite compact, and its response will be fast.

Figure 7:
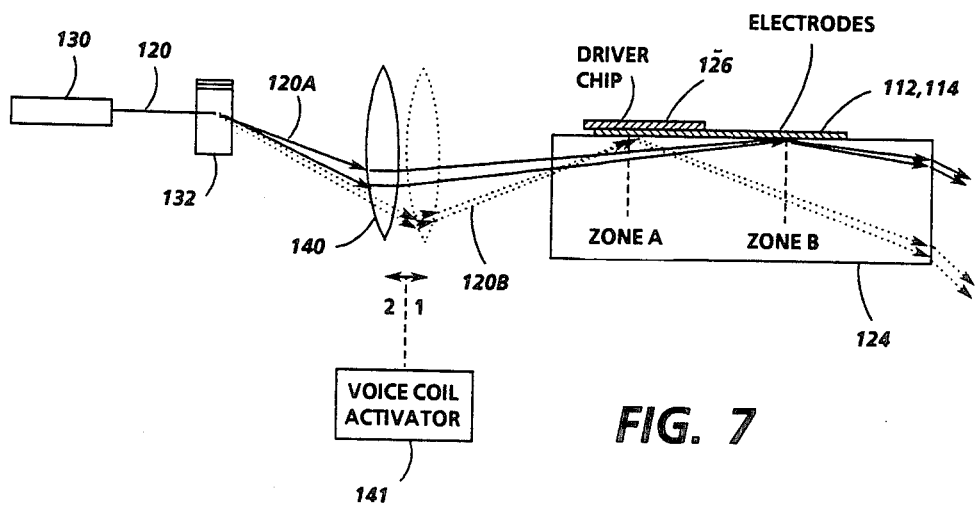
FIG. 7 is a schematic side view of the two zone TIR optical modulator in accordance with the principles of the present invention utilizing dynamic focus correction with a single lens.

The lens 134 in FIG. 6 can be made as a separate system component, or the same lens can have a double function of deflecting and simultaneously focussing the beam. See lens 140 in FIG. 7. The operation is essentially similar to that described above the FIG. 6, although a different acousto-optical deflection angle may be necessary for precise beam positioning. This lens can be the same type of a fast-response CD lens mentioned in the previous paragraph. The actual configuration would depend on the optical arrangement of the rest of the system.

Depending on the post-modulator imaging optics utilized, a similar output focus adjusting arrangement may be needed. Such a design would have to work synchronously with the input addressing. Because the two patterns originate from two different zones (A & B), they cannot be imaged on the photoreceptor surface by the same output lens, unless: (a) the lens moves to accomodate the shift, (b) the lens changes optical power, or (c) the optical system can tolerate the defocus of the pixels. The latter will depend on output optical system parameters such as depth of focus.

One way to provide the dynamic shift in output focus would be to have another correction lens at the output, which would work in tandem with the input focusing lens. For instance, when zone A is being addressed (FIG. 8), the input lens 136 would move to position 1. The output corrective lens 140 will have to move toward the modulator to preserve precise imaging of the pattern on the photoreceptor 142 through lens 160. When zone B is addressed, the input lens 136 moves to position 2, and the output correction lens 140 moves away from the modulator. The output correction lens does not have to be the whole imaging lens assembly. It can be just a single moving element working outside or inside a stationary output lens. Other methods of output defocus correction, such as actively driven electro-optic plates, or other, can be employed.

A vertical image shift is inherently present in the proposed configuration. This is due to the fact that the pixel patterns originate from different regions, and the shift has a vertical component in it. It may be possible by the use of various optical elements placed after the modulator described above to utilize this shift for a perfect interlace of both pixel patterns on the same line, irrespective of an output medium travel. The amount of vertical shift is small and it is fixed at the point where the beams emerge from the modulator. Due to magnification of the output optics this shift will be larger at the photoreceptor. Beam 120A, as deflected at zone A, will strike the photoreceptor at point 164, while beam 120B, as deflected at zone B, will strike the photoreceptor 142 at point 166. The output optics will magnify the shift precisely to match the speed of the photoreceptor rotation, so that one half line of pixels will 'catch up' to the half line already printed on the photoreceptor.

The main advantage of the present invention over the previous design, (as may be seen in the aforementioned patent) is that the output resolution is greatly improved, while the driver chip, general coupling scheme, and the crystal remain essentially unchanged.

Figure 5A:
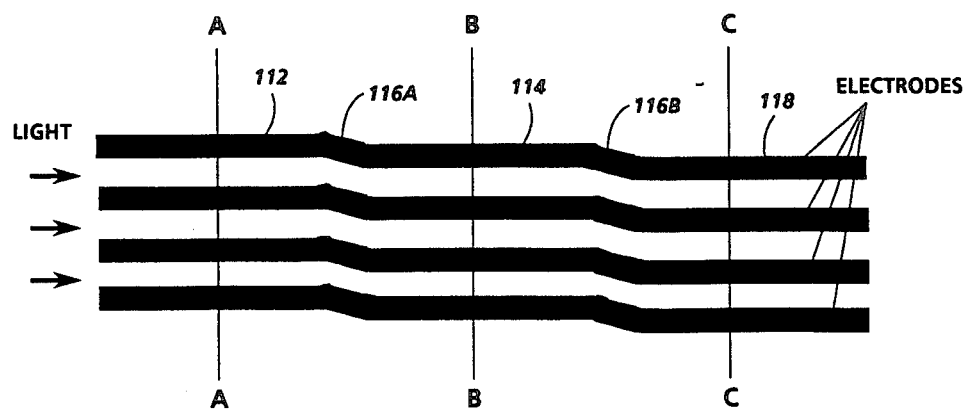
Figure 5B:
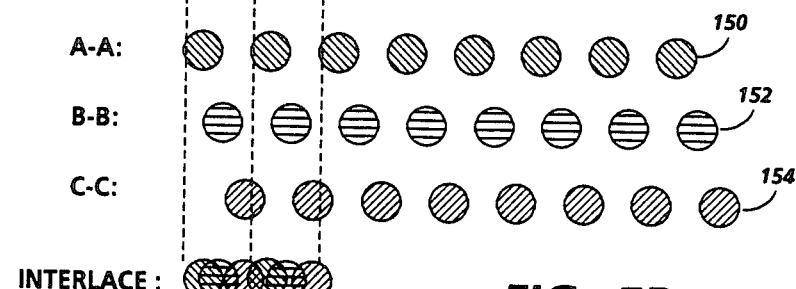
FIG. 5b is a representation of the output planes of pixels showing the three separate deflected light beams and the interlacing pattern as would be generated by the three separate zones of interaction.

The driving electrodes can also be made with several interaction regions instead of two, as was described in detail above. In this embodiment, FIG. 7, the stagger pitch of the electrodes would have to be a fraction of the electrode spacing, and not equal to it, as in the embodiment shown in FIG. 5. This would lead to a sub-pixel shift at the output. FIG. 5A shows an electrode array with three such interlace patterns 112, 114, and 118, separated by offset sections 116A and 116B. FIG. 5B shows the interlacing out pixel pattern comprising pixels 150, 152, and 154 for each line. With the resolution thus increased, the output document carries more information and is easily on the human eye to read it.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. In an electro-optic line printer having a multi-gate light valve for modulating a sheet-like, collimated light beam in accordance with input data samples of finite duration representing individual picture elements of an image, said light valve including an optically transmissive electro-optic element having a predetermined optical axis, first and second sets of individually addressable electrodes longitudinally displaced from one another along said optical axis, the electrodes of said first and second sets being intimately coupled to said electro-optic element and being distributed thereacross in laterally staggered relationship for spatially modulating said light beam, and means for sequentially addressing said first and second sets of electrodes with said collimated light beam, wherein said first and second sets of electrodes create electric fringe fields in said electro-optic element in response to said data samples, thereby modulating the phase front of said light beam in response to said data samples.

2. The electro-optic line printer as set forth in claim 1 wherein said sequentially addressing means includes acousto-optic modulator means to deflect said collimated light beam to said first and second sets of electrodes.

3. The electro-optic line printer as set forth in claim 1 wherein said sequentially addressing means includes electro-optic modulator means to deflect said collimated light beam to said first and second sets of electrodes.

4. The electro-optic line printer as set forth in claim 2 further including lens means for receiving and focussing said deflected light beam onto said first and second sets of electrodes.

5. The electro-optic line printer as set forth in claim 4 wherein said lens means includes deflecting lens means for directing said light beam toward said light valve, and focussing lens means for selectively focusing said light beam on said first and second set of electrodes, respectively.

6. The electro-optic line printer as set forth in claim 5 wherein said focussing lens means comprises a voice-coil driven lens means driven from a first position to a second position.

7. The electro-optic line printer as set forth in claim 4 wherein said lens means includes a combined deflecting and focussing lens means for directing towards and focussing on said light beam on said first and second set of electrodes, respectively.

8. The electro-optic line printer as set forth in claim 7 wherein said electro-optic element has a reflecting surface, said first and second sets of electrodes being intimately coupled to said electro-optic element adjacent said reflecting surface to create electric fringe fields in interaction regions proximate said reflecting surface, and said light beams being applied to said first and second sets of electro-optic elements, respectively, at a grazing angle of incidence relative to said reflecting surface and is brought to a wedge shaped focus on said reflecting surface along a line approximately the center of each of said first and second sets of said electrodes, whereby said light beam interacts with the fringe fields created by said first set of electrodes and with the fringe fields created by said second set of electrodes after being totally internally reflected from said reflecting surface.

9. The electro-optic line printer as set forth in claim 8 wherein the corresponding electrodes of said first and second sets are electrically interconnected to receive said data samples simultaneously.

10. The electro-optic line printer as set forth in claim 9 wherein said electro-optic element is a crystal having a polished input face, a polished output face, and a polished reflecting surface between said input face and said output face.

11. The electro-optic line printer as set forth in claim 10 wherein said first and second sets of individually addressable electrodes are paired with respective ground plane electrodes, and said ground plane electrodes are intimately coupled to said electro-optic element adjacent said reflecting surface and are distributed across said electro-optic element in alternating paired relationship with said individually addressable electrodes.

12. The electro-optic line printer as set forth in claim 1 further including means for sequentially focussing the modulated light beam from said electro-optic element, said sequentially focussing means operating synchronously with said sequentially addressing means.

13. The electro-optic line printer as set forth in claim 12 wherein either or both of said sequentially focussing means on said sequentially addressing means comprises a voice coil activated lens means.

14. In an electro-optic line printer having a multi-gate light valve for modulating a sheet-like, collimated light beam in accordance with input data samples of finite duration representing individual picture elements of an image, said light valve including an optically transmissive electro-optic element having a predetermined optical axis, individually addressable sets of electrodes longitudinally displaced from one another along said optical axis, the electrodes of said sets being intimately coupled to said electro-optic element and being distributed thereacross in laterally staggered relationship for spatially modulating said light beam, and means for sequentially addressing said sets of electrodes with said collimated light beam, wherein said sets of electrodes create electric fringe fields in said electro-optic element in response to said data samples, thereby modulating the phase front of said light beam in response to said data samples.

15. The electro-optic line printer as set forth in claim 14 wherein said sequentially addressing means includes acousto-optic modulator means to deflect said collimated light beam to said sets of electrodes.

16. The electro-optic line printer as set forth in claim 15 further including lens means for receiving and focussing said deflected light beam onto said sets of electrodes.

17. The electro-optic line printer as set forth in claim 16 wherein said lens means includes deflecting lens means for directing said light beam toward said light valve, and focussing lens means for selectively focusing said light beam on said first and second set of electrodes, respectively.

18. The electro-optic line printer as set forth in claim 17 wherein said focussing lens means comprises a voice-coil driven lens means driven from position to position.

19. The electro-optic line printer as set forth in claim 14 further including means for sequentially focussing the modulated light beam from said electro-optic element, said sequentially focussing means operating synchronously with said sequentially addressing means.

20. The electro-optic line printer as set forth in claim 19 wherein either or both of said sequentially focussing means or said sequentially addressing means comprises a voice coil activated lens means.

* * * * *